United States Patent [19]

Müller et al.

[11] 4,113,071

[45] Sep. 12, 1978

[54] STAY

[75] Inventors: Hans Müller, Wolfsburg; Georg Hanke, Hattorf, both of Fed. Rep. of Germany

[73] Assignee: Volkswagenwerk Aktiengesellschaft, Wolfsburg, Fed. Rep. of Germany

[21] Appl. No.: 746,101

[22] Filed: Nov. 30, 1976

[30] Foreign Application Priority Data

Dec. 6, 1975 [DE] Fed. Rep. of Germany ....... 2555062

[51] Int. Cl.² .............................................. F16F 9/34
[52] U.S. Cl. ...................................... 188/282; 16/82; 188/300; 248/354 H; 267/64 R; 267/124; 296/56
[58] Field of Search ................ 188/300, 282, 317; 16/1 C, 52, 66, 82, 84; 292/338; 248/354 H; 296/56; 267/64 R, 65 R, 120, 124

[56] References Cited

U.S. PATENT DOCUMENTS

| 2,953,810 | 9/1960 | Hall | 16/52 |
| 2,953,811 | 9/1960 | Hall | 16/66 |
| 3,299,990 | 1/1967 | Ratcliffe | 188/317 X |
| 3,851,867 | 12/1974 | Fricko | 188/300 X |

*Primary Examiner*—George E. A. Halvosa
*Attorney, Agent, or Firm*—Spencer & Kaye

[57] ABSTRACT

A stay for use with a cover or the like and having a cylinder containing a pressure fluid medium and a piston arranged for movement into and out of the cylinder. The piston rod carries a piston which is slidably arranged within the cylinder and which itself is mounted on the piston rod for axial displacement relative thereto and has at least one opening that allows the pressure fluid medium to flow through the piston. The piston rod itself has two abutments, the first being arranged in the region of the interior end of the piston and the second being spaced from the first abutment, these two abutments having the piston arranged between themselves and limiting the axial displacement of the piston with respect to the piston rod. Moreover, the piston rod carries a cover element which is likewise axially displaceable relative to the piston rod and is adapted to close the opening or openings of the piston. A spring is provided to bias the cover element toward the piston such that the cover element closes the opening or openings of the piston while the piston and piston rod are stationary and the piston is in a position in which it is displaced toward the second of the two abutments. Finally, there is a third abutment which is on the piston rod and is arranged next to the second abutment, this third abutment serving the function of limiting the movement of the cover element toward the interior end of the piston rod.

5 Claims, 5 Drawing Figures

STAY

BACKGROUND OF THE INVENTION

The present invention relates to a stay which contains at least one pressure medium, suitable for use with a cover or the like, particularly a cover associated with the front or rear compartment of a motor vehicle, such as the hood of the engine compartment, be it located at the front or rear, or the cover of the trunk compartment, be it at the front or rear.

There exist stays of the above type which comprise a cylinder having within it a reciprocatingly mounted piston rod which is equipped with a piston having at least one opening through which the pressure medium may flow. One such stay, if, when filled with a gaseous medium, is known as an aircushion-type spring, is shown, for example, in German Utility Model (Gebrauchsmuster) No. 7,410,489, published July 17th, 1975. By filling the stay at least partly with a gaseous medium, the remainder of the pressure fluid medium being a hydraulic, i.e., liquid, medium, has the advantage that when the stay is connected to the cover or the like, the gaseous medium which on that side of the piston that faces away from the piston rod exerts a pressure on the piston which tends to move the piston rod out of the cylinder and thus at least partly helps to open the cover or lid. Using a liquid medium in addition to the gaseous medium, has the advantage that the arrangement as a whole is more easily sealed off from the outside.

A stay of the above type has to be so constructed and arranged that the braking action exerted by the stay is directionally selective. That is to say, if the stay is used, for instance, in connection with the rear cover of a motor vehicle, the arrangement of the parts should be such that the stay should not hinder the opening of the cover, on the contrary, it should facilitate it, while the parts should additionally be so arranged as to allow the cover to be held in its open position, and if possible in intermediate positions. On the other hand, the holding force which maintains the cover in its open position should not be so large as to lock the cover into its open position, instead, the stay should make it possible for the cover to be closed more or less easily through the application of a manual force. Indeed, the force required to close the cover should preferably be no greater than that which can be exerted by one hand, so that the person closing the cover can have the second hand free for carrying things or for any other purpose.

One way to obtain the directional selectivity would be by equipping the piston with different openings which are provided with respective check valves which act in opposite directions and respond to different pressures. Such an arrangement would in practice, be likely to have a number of disadvantages because the openings which allow the flow of the pressure medium through the piston must, if the cylinder is filled with a liquid medium, be sufficiently large to allow for the increased viscosity during cold-weather operation. This, in turn, makes it necessary to make the piston relatively large in order to accommodate such large size openings each of which, it will be remembered, serves to permit the flow of liquid in but one direction. Moreover, as the increased pressure which prevails on that side of the piston which is directed away from the piston rod and which is supposed to assist the opening of the cover has to flow through a check valve, any delay in the opening of this check valve will undermine whatever assistance the increased pressure might otherwise be able to provide.

It is, therefore, the primary object of the present invention to provide a stay for use with a cover or the like which overcomes the above drawbacks, which is of simple, sturdy and compact construction, and which is able to give long periods of trouble-free service.

BRIEF DESCRIPTION OF THE INVENTION

With the above object in view, the present invention resides, basically, in a stay of the above type having a cylinder containing a pressure fluid medium and a piston rod arranged for movement into and out of the cylinder. The piston rod carries a piston which is slidably arranged within the cylinder and which itself is mounted on the piston for axial displacement relative thereto and which has at least one opening that allows the flow of pressure fluid medium through the piston. The piston rod itself has two abutments, the first being arranged in the region of the interior end of the piston and the second being spaced from the first abutment, these two abutments having the piston arranged between themselves and limiting the axial displacement of the piston with respect to the piston rod. Moreover, the piston rod carries a cover element which is likewise axially displaceable relative to the piston rod and is adapted to close the opening or openings of the piston. A spring is provided to bias the cover element toward the piston such that the cover element closes the opening or openings of the piston while the piston and piston rod are stationary and the piston is in a position in which it is displaced toward the second of the two abutments. In addition, there is a third abutment which is on the piston rod and is arranged next to the second abutment, this third abutment serving the function of limiting the movement of the cover element toward the interior end of the piston rod.

In accordance with various other features of the present invention, the spring is helical and surrounds the piston rod, and one end of the spring coacts with the cover element and the other end coacts with a fourth abutment on the piston rod through the intermediary of a ring-shaped contact element which is likewise mounted on the piston rod for axial displacement relative thereto.

DETAILED DESCRIPTION OF THE PREFERRED EMBODIMENT

Figure 1:
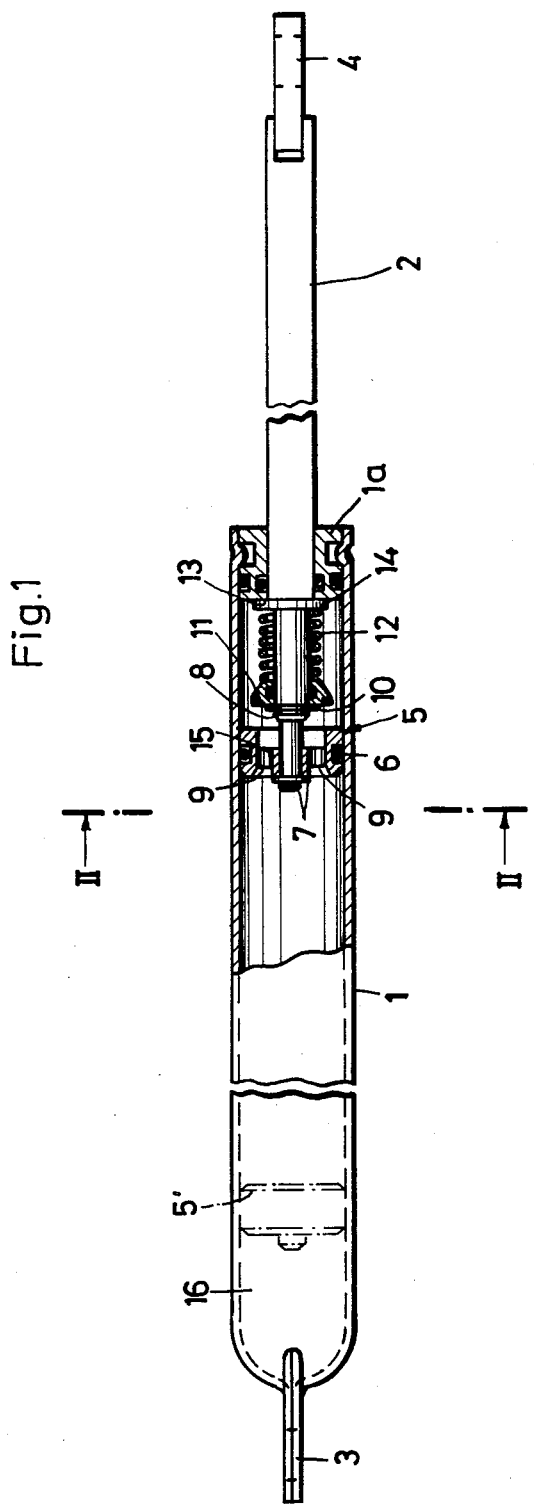
FIG. 1 is a longitudinal sectional view of the stay according to the present invention, the parts being shown as occupying one of the operative positions of the stay.
Figure 2:
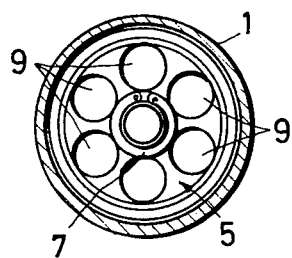
FIG. 2 is a view partly in section, taken on line II—II, but on an enlarged scale, of FIG. 1.

Referring now to the drawings and to FIG. 1 in particular, the same shows a stay or brace according to the present invention and suitable for holding up a cover, lid or the like, especially a cover associated with an automotive vehicle, such as the front or rear cover of an engine or trunk compartment.

The externally visible parts of the stay are a cylinder 1 which is filled with a gaseous as well as a liquid pressure fluid medium, and a piston rod 2. The closed end of the cylinder 1, shown at the left in the drawing, is provided with a connecting element such as an eyelet 3 whereas the right-hand end of the piston 2 which projects through the right-hand end of the cylinder is provided with a comparable connecting element such as eyelet 4. As is conventional, the piston rod passes through a fluid-tight sealing arrangement 1a which maintains the fluid media in the cylinder 1 while permitting the piston rod to reciprocate to and fro.

In practice, the stay, which, for the purposes of illustration will hereinafter be described as being used in conjunction with the rear cover of a compartment of a motor vehicle, will be oriented in such a way that when the cover is closed, the eyelet 3 associated with the cylinder 1 will be at the top, i.e., it will be above the level occupied by the eyelet 4 associated with the piston rod 2.

The interior mechanism of the stay includes a piston 5 which is slidably arranged within the cylinder 1 and is provided with a conventional sealing element such as O-ring 6. The piston 5 itself is mounted on the piston rod 2 but is not fixedly attached thereto, instead, the piston 5 is mounted so as to be slidable along the piston rod 1 in axial direction. This axial displacement is limited by a first abutment 7 located in the region of the interior, left-hand end of the piston rod 2, and a second abutment 8 which is likewise on the piston rod 2 and is spaced from the first abutment 7. The piston 5 is provided with a centrally located sleeve-shaped portion 15 and has one or more openings 9 whose total cross-sectional area is as large as possible so as to permit the flow of pressure fluid medium from one side of the piston to the other.

The internal mechanism of the stay is provided with a third abutment 10 which is in the region of the second abutment 8, the purpose of the third abutment 10 being to limit the axial movement of a cover element 11 which is likewise slidably mounted on the piston rod 2 for axial displacement relative thereto. The cover element 11 is spring-biased leftwardly, as viewed in FIG. 1, by a helical coil spring 12 which tends to displace the cover element 11 toward the piston 5, the arrangement of the parts being such that the cover 11 is adapted to close off the openings 9 of the piston 5. The right-hand end of the coil spring 12 engages a fourth abutment 13 through the intermediary of a contact element in the form of a ring 14 which itself is slidably mounted on the piston rod 2.

The operation of the parts is as follows:

FIG. 1 shows the position which the parts occupy when the cover with which the stay is associated is fully open but before the stay serves to hold the cover in its open position. It will be noted that in this position, the spring 12 serves to provide a resilient abutment, inasmuch as none of the elements which itself is rigidly connected to the piston rod 2 will bear against the sealing arrangement 1a. Rather, the element which does engage the sealing arrangement 1a is the afore-mentioned contact element, namely, the ring 14 which, in turn, is acted on by the spring 12.

Figure 3:
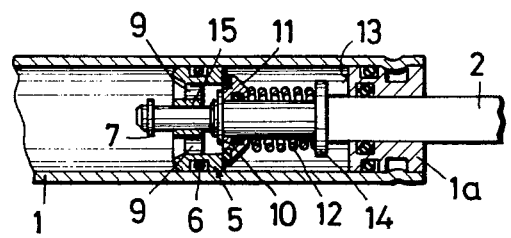
FIG. 3 is a fragmentary view showing certain of the parts depicted in FIG. 1, occupying a different operative position.

When the person holding the cover open releases it, the weight of the cover will cause the latter to drop slightly, and this in turn will cause the piston rod 2, and with it the cover element 11, to move slightly until the cover element 11 comes to lie on the piston 5, thereby effectively closing off and sealing the openings 9 of the piston 5. This is the position of the parts as shown in FIG. 3.

Figure 4:
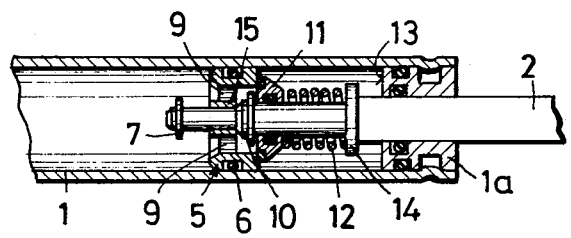
FIG. 4 is a fragmentary view similar to FIG. 3 but showing the parts occupying still another operative position.

The spring 12 should be so designed and be of such strength that, during this movement, the adjacent turns of the spring will not come to lie against each other under the influence of the weight of the cover with which the stay is associated, as otherwise the piston 5 would be made to move relative to the piston rod 2 until the abutment 8 becomes effective by engaging the above-mentioned centrally positioned sleeve portion 15 of the piston 5. Such relative movement of the piston 5 with respect to the piston rod 2 should be permitted to take place only after the person wishing to close the cover exerts an additional downward force on the cover. This is the position of the parts as shown in FIG. 4.

Figure 5:
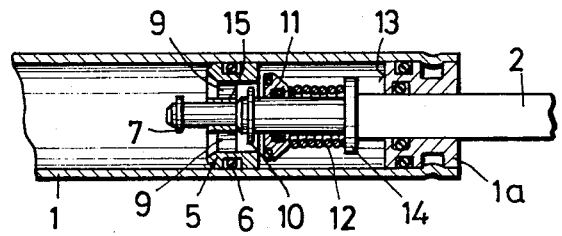
FIG. 5 is a fragmentary view similar to FIGS. 3 and 4 but showing yet another operative position.

After the downward movement of the cover under the influence of the additionally applied force has begun, the piston 5 and piston rod 2 will move together, but this will be possible only after the cover element 11 has moved away from the piston 5 (rightwardly as viewed in the drawings) against the force of the spring 12, due to the now increased pressure prevailing to the left of the cover element 11, thus moving the cover element 11 slightly away from the piston 5 and thereby permitting the flow of pressure fluid medium through the openings 9 of the piston 5. This is the position of the parts as shown in FIG. 5.

The further the piston rod 2 moves into the interior of the cylinder 5, the smaller will become the volume available to contain the pressure medium, thereby increasing the pressure exerted by it. As the piston 5 moves into the position 5' shown in phantom lines, the gaseous pressure medium in cylinder 1 will move into the space 16, which is now next to the eyelet 3 at the top of the stay, and this gaseous medium is compressed, to a relatively large extent, within this space 16. Thus, when the cover is to be opened, which can be done, for example, by unlocking it, a relatively large force will be exerted on the piston, the same still being in its position 5', and on the cover 11 which, at this time, will itself be in a position wherein it covers the openings 9, so that at least the initial opening movement of the cover will occur automatically, i.e., the cover will, under the influence of the energy stored in the compressed gaseous medium in chamber 16, be opened at least part of the way as soon as it is unlocked.

It will be seen from the above that it is one of the features of the present invention to provide the piston 5 which is mounted on the piston rod 2 so as to be axially displaceable with respect thereto between given limits, i.e., the limits defined by the first and second abutments 7 and 8, the arrangement of the parts - namely, the piston 5, the first and second abutments 7, 8, the cover element 11 and the spring 12 — being such that the piston is axially freely displaceable between the first and second abutments 7, 8 without being under the influence of the spring 12. Within this range of movement, the piston 5 is held in place by the friction exerted by it on the inner wall of the cylinder 1, thus allowing the cover element 11 to seal off or uncover the openings 9 at the appropriate times, namely to close the openings while the piston 5 and piston rod 2 are stationary and the piston 5 is in a position wherein it is displaced toward the second abutment 8. This will occur, for instance, when the stay holds the cover with which it is associated in open position, so that the pressure fluid medium cannot flow through piston 5 from that side thereof which is opposite the side on which the cover element 11 is located, thus producing the desired staying or holding effect. It is only when a closing force is applied to the cover, which, as stated above, can be done manually, will the piston 5 be engaged by the abutment 8 and be moved away from the cover element 11, whereupon the pressure of the medium now flowing through the piston 5 will be sufficiently great to lift the cover element 11 off the openings 9, thus allowing the flow of the pressure fluid medium through the piston 5, as described above. If, when the cover with which the stay is associated is closed and as stated above, the eyelet 3 attached to cylinder 1 is at the top and the eyelet 4 attached to piston rod 2 is at the bottom, i.e., if that end of piston rod 2 which carries the piston 5 is at the top, the gaseous medium trapped in the space above the piston 5 will serve at least initially to open the cover when the same is unlocked.

Moreover, thanks to the coaction of the spring 12 with the fourth abutment 13 through the intermediary of the ring-shaped contact element 14, there is obtained a spring-cushioned abutment that is effective when the piston rod 2 has been moved out of the cylinder 1 and the cover is in open position.

Finally, it will be understood that the above-described functional and structural advantages, including the directional selectivity and the spring-abutment for the cover while the same is in open position, are obtained without making it necessary to provide oversized parts, or an excessive number of structural elements other than those used in heretofore conventional stays.

It will be understood that the above description of the present invention is susceptible to various modifications, changes, and adaptations, and the same are intended to be comprehended within the meaning and range of equivalents of the appended claims.

What is claimed is:

1. A stay for use with a cover or the like and comprising:
   (a) a cylinder for containing a pressure fluid medium and having a sealing arrangement at one end thereof;
   (b) a piston rod arranged for movement through said sealing arrangement into and out of said cylinder and having an interior end within said cylinder;
   (c) a piston carried by said piston rod and slidably arranged within said cylinder, said piston being mounted on said piston rod, for axial displacement relative thereto and having opening means for allowing the flow of the pressure fluid medium through said piston;
   (d) first abutment means arranged in the region of said interior end of said piston rod and second abutment means spaced from said first abutment means, said first and second abutment means being on said piston rod, said piston being arranged between said first and second abutment means such that said first and second abutment means limit the axial displacement of said piston with respect to said piston rod;
   (e) a cover element mounted on said piston rod for axial displacement relative thereto and being adapted to close said opening means of said piston;
   (f) spring means having one end coacting with said cover element for biasing the same toward said piston such that said cover element closes said opening means of said piston while said piston and piston rod are stationary and said piston is in a position wherein it is displaced toward said second abutment means; said piston, said first and second abutment means, said cover element and said spring means being arranged such that said piston is axially freely displaceable between said first and second abutment means without being under the influence of said spring means;
   (g) third abutment means, arranged on said piston rod next to said second abutment means, for limiting the movement of said cover element toward said interior end of said piston rod; and
   (h) fourth abutment means on said piston rod, the other end of said spring coacting with said fourth abutment means as well as with said sealing arrangement.

2. A stay as defined in claim 1, wherein said spring means comprise a helical spring which surrounds said piston rod.

3. A stay as defined in claim 1, further comprising a contact element mounted on said piston rod for axial displacement relative thereto and interposed between said fourth abutment means and said other end of said spring, in consequence of which said spring coacts with said fourth abutment means and said sealing arrangement through the intermediary of said contact element.

4. A stay as defined in claim 3, wherein said contact element is in the form of a ring.

5. The combination defined in claim 1, wherein the cover is a rear cover of the compartment of a motor vehicle.

* * * * *